US008666586B2

(12) United States Patent
Portocalis et al.

(10) Patent No.: US 8,666,586 B2
(45) Date of Patent: Mar. 4, 2014

(54) ENTERPRISE FUEL MANAGEMENT SYSTEM (75) Inventors: Gerasimos A. Portocalis, Dallas, TX (US); Gail A. Moser, Dallas, TX (US); James R. Wright, Plano, TX (US)

(73) Assignee: QT Technologies, Dallas, TX (US)

( * ) Notice: Subject to any disclaimer, the term of this patent is extended or adjusted under 35 U.S.C. 154(b) by 76 days.

(21) Appl. No.: 13/331,566

(22) Filed: Dec. 20, 2011

(65) Prior Publication Data
US 2012/0173072 A1 Jul. 5, 2012

Related U.S. Application Data (60) Provisional application No. 61/428,471, filed on Dec. 30, 2010.

(51) Int. Cl.
G06F 19/00 (2011.01)
(52) U.S. Cl.
USPC .......................................................... 701/29.3
(58) Field of Classification Search
USPC ................ 701/29.3, 400, 468, 482–485; 340/426.19, 426.2, 426.22; 702/182
See application file for complete search history.

(56) References Cited

U.S. PATENT DOCUMENTS

| 3,937,083 | A | 2/1976 | Sabatino et al. |
| 4,296,472 | A | 10/1981 | Sarkis |
| 4,442,953 | A | 4/1984 | Miyamoto et al. |
| 5,265,032 | A | 11/1993 | Patel |
| 5,319,545 | A | 6/1994 | McGarvey et al. |
| 5,557,084 | A | 9/1996 | Myers et al. |
| 5,596,501 | A | 1/1997 | Comer et al. |
| 5,613,778 | A | 3/1997 | Lawson |
| 5,706,273 | A | 1/1998 | Guerreri |
| 5,785,100 | A | 7/1998 | Showalter et al. |
| 5,816,491 | A | 10/1998 | Berkeley et al. |
| 6,119,058 | A | 9/2000 | Anderberg |
| 6,374,187 | B1 | 4/2002 | Knight et al. |

(Continued)

FOREIGN PATENT DOCUMENTS

FR 2759455 8/1998

OTHER PUBLICATIONS

The International Search Report and Written Opinion; dated Jun. 5, 2012; 10 pages; ISA, Commissioner for Patents, P.O. Box 1450, Alexandria, VA 22313-1450.

(Continued)

*Primary Examiner* — Yonel Beaulieu
(74) *Attorney, Agent, or Firm* — Gardner Groff Greenwald & & Villanueva, PC (57) ABSTRACT An enterprise fuel management system for managing fueling operations of an aircraft fleet operated by a fleet operator having a central computer system at a data center and operating aircraft at multiple airports avoids reliability problems associated with synchronizing a central database with local databases. Data collection units communicate collected fueling information wirelessly to a central data center, and the data collection units are not in direct communication with the fleet operator's central computer system. Moreover, the central data center gathers fueling information from the various data collection units and communicates the gathered fueling information to the fleet operator's central computer system as data messages for subsequent processing and action. In this way, the fleet operator's central computer system can maintain the only database of fueling information and flight information, obviating the need to synchronize the data in the fleet operator's computer system with data in some other computer system.

15 Claims, 9 Drawing Sheets

(56) References Cited

U.S. PATENT DOCUMENTS

| | | |
|---|---|---|
| 6,390,151 B1 | 5/2002 | Christman et al. |
| 6,546,314 B1 | 4/2003 | Carr et al. |
| 6,816,762 B2 | 11/2004 | Hensey et al. |
| 7,228,210 B2 | 6/2007 | Davis et al. |
| 7,353,703 B2 | 4/2008 | Kunter |
| 7,376,495 B2 | 5/2008 | Coggins et al. |
| 7,463,971 B2 | 12/2008 | Holcomb et al. |
| 7,536,264 B2 | 5/2009 | Hillam et al. |
| 7,642,742 B2 | 1/2010 | Curello et al. |
| 7,647,163 B2 | 1/2010 | Allen |
| 8,055,526 B2 | 11/2011 | Blagg et al. |
| 2001/0034567 A1 | 10/2001 | Allen et al. |
| 2002/0065698 A1 | 5/2002 | Schick et al. |
| 2003/0149491 A1 | 8/2003 | Adachi et al. |
| 2004/0030457 A1 | 2/2004 | Bayoumi et al. |
| 2007/0262855 A1* | 11/2007 | Zuta et al. .................... 340/439 |
| 2008/0126111 A1 | 5/2008 | Loda |
| 2008/0195442 A1 | 8/2008 | Blagg et al. |
| 2009/0045924 A1 | 2/2009 | Roberts, Sr. et al. |
| 2009/0164347 A1 | 6/2009 | Sison et al. |
| 2010/0036596 A1 | 2/2010 | Dunsky |
| 2010/0114616 A1 | 5/2010 | Touati |
| 2011/0130883 A1 | 6/2011 | Perez |
| 2011/0140877 A1 | 6/2011 | Gilchrist et al. |
| 2011/0247705 A1 | 10/2011 | Humphrey |
| 2012/0043425 A1 | 2/2012 | Beck |

OTHER PUBLICATIONS

International Preliminary Report on Patentability for Application Serial No. PCT/US2011/066110; The International Bureau of WIPO; Geneva, Switzerland; Jul. 11, 2013; 7 pages.

* cited by examiner

FIG. 9

ENTERPRISE FUEL MANAGEMENT SYSTEM

CROSS-REFERENCE TO RELATED APPLICATION

This application claims the priority benefit of U.S. Provisional Patent Application Ser. No. 61/428,471, filed Dec. 30, 2010, which is hereby incorporated herein by reference.

TECHNICAL FIELD

The present invention relates to a fuel management system for users of fuels, such as aviation fleets.

BACKGROUND OF THE INVENTION

In the past, it has been known to attempt fuel management at airports using a more or less decentralized approach. An example of such is shown in U.S. Pat. No. 7,376,495, which shows and describes a system that collects data with a hand-held computer (the so-called fueling agent client device) and forwards it to a local server (the "fuel management server" 102).

Figure 1:
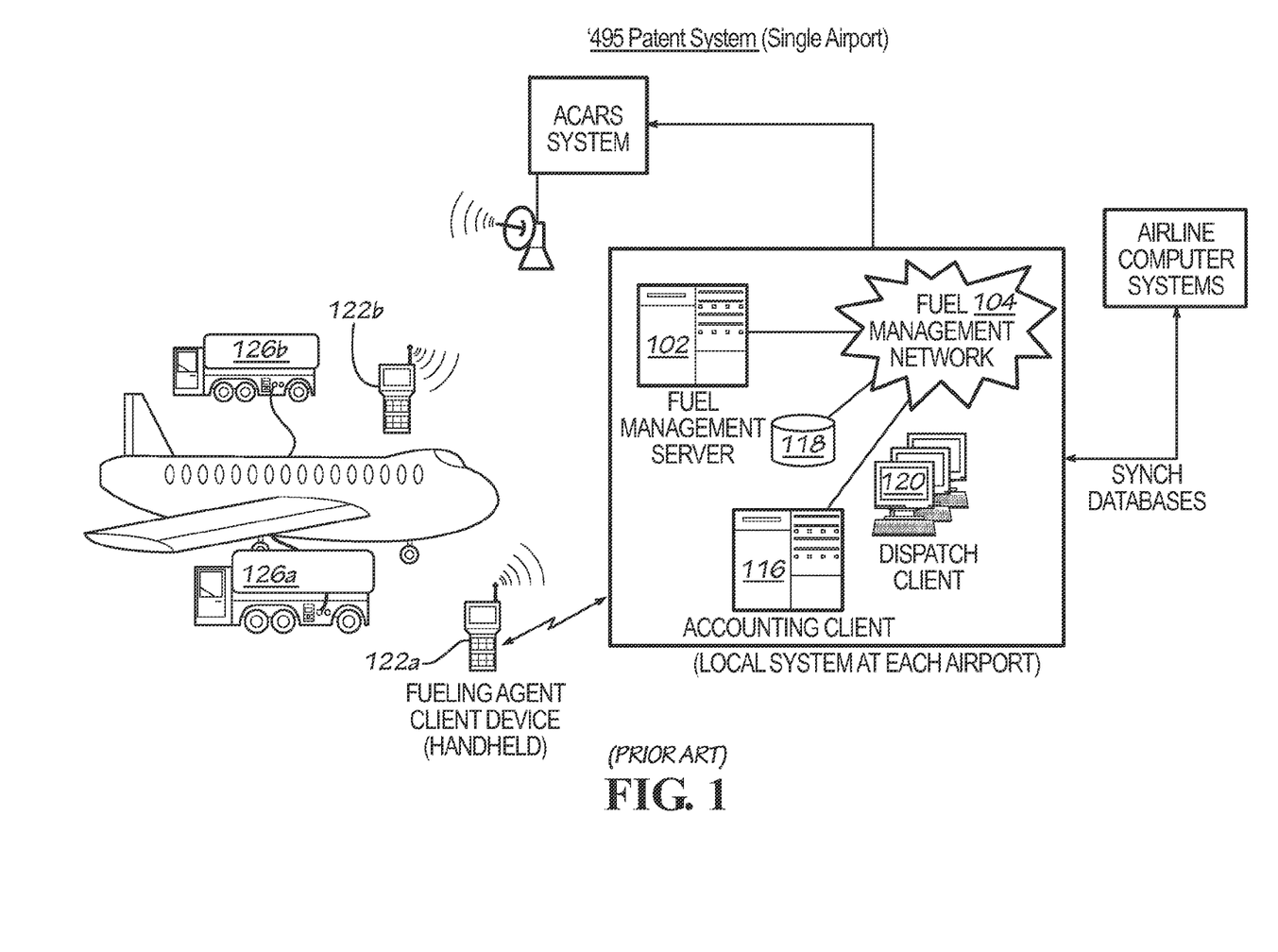
FIG. 1 is a schematic illustration of a prior art fuel management messaging system.

As shown in FIG. 1 of the U.S. Pat. No. 7,376,495 and as described in its specification, the system taught by the patent is a client-server arrangement in which the server 102 collects information from an external airline computer system, collects data from the client device, and makes management fueling decisions as required by the fueling agent client device (the master device).

The U.S. Pat. No. 7,376,495 further describes that the local server's database is a local "master" database and is regularly synchronized with the airline's database. Because the airline's data can change frequently and quickly, the synchronization is carried out very frequently (on the order of every few seconds or so).

Thus, according to the U.S. Pat. No. 7,376,495, the system disclosed therein uses a local server at the airport and the local server creates and maintains its own database of information for that airport. The local server does the computing and sends the fueling confirmation message to an ACARS radio relay system to relay it on to the pilot in the cockpit. Periodically (very frequently, actually), the local database has to be synchronized with the airline computer system. Indeed, the '495 patent states "The fuel management server 102 stores its own copy of the fuel planning information and flight information (e.g., in database 118). The fuel management server 102 periodically synchronizes its local copy of the fuel planning information and flight information with updated information from the airline computer system".

An unfortunate side effect of using a local server in this way is that it requires a separate server for each airport. If the airlines were operating at just one or two airports, such might be practical. But it becomes problematic if a large number of airports are involved. In practice there can be hundreds of airports for a given fleet operator (like an airline), leading to substantial complexity and difficulties.

This local server arrangement leads to significant unreliability. As the number of airports being serviced by such a system grows for a single airline operating such a system, the number of synchronizations going on begins to become unwieldy, leading to frequent downtime as data discrepancies between the databases and/or communication conflicts bring one or more systems off-line. For example, at the time of filing this patent application, at least one airline operates at hundreds of airports and utilizes a Varec, Inc. system in keeping with the U.S. Pat. No. 7,376,495. To use the patented system for such an airline means that there are hundreds of servers connected to the airline computer system, with each server attempting to synchronize its local database on a more or less steady basis. Such an implementation can lead to a substantial reliability issue for the airline.

Accordingly, it can be seen that there exists a need for a fuel management system that is highly reliable. It is to the provision of solutions to this and other problems that the present invention is primarily directed.

SUMMARY OF THE INVENTION

By contrast, the present invention completely eliminates the need for local fuel management servers at each location. Instead, hand-held devices at each location forward their collected data to a data center in a central location. The central data center then forwards the aggregated data to the fleet operator's data center as data messages (for example, as MQ messages). The fleet operator's computer systems then use the data, take action in response to the data, forward messages to the pilot through the ACARS system utilizing the data, etc. In this regard, the central data center is more like a data forwarding station, sorting out the various incoming raw data received from the various hand-held units and managing the communication to the airline data center (acting like a traffic cop, of sorts). Importantly, in this arrangement, there is only one database (the fleet operator's), so there is no synchronization needed.

This enterprise approach, rather than a decentralized approach known in the prior art, has important advantages. First of all, it allows the enterprise to better control its own data. Secondly, the enterprise is more in control of all refueling decisions. Moreover, as will be described further below, the system is more amenable to large scale operations and is inherently more reliable at larger scales.

Since there is no synchronization of multiple databases and greatly simplified communication with the airline's system, system crashes due to data discrepancies/communication conflicts are eliminated or minimized. This results in substantially improved reliability. Inasmuch as downtime can ground planes and passengers, this improved reliability is a key benefit/feature of the invention.

Defined another way, the present invention comprises an enterprise fuel management system for managing fueling operations of an aircraft fleet operated by a fleet operator having a central computer system at a data center and operating aircraft at multiple airports. The system includes a central data center in communication with the fleet operator's central computer system for forwarding data to the fleet operator's central computer system. The system also includes, at each airport, one or more data collection units for collecting fueling information and forwarding it to the central data center. Advantageously, the data collection units communicate the collected fueling information wirelessly to the central data center, and the data collection units are not in direct communication with the fleet operator's central computer system. Moreover, the central data center gathers fueling information from the various data collection units and communicates the gathered fueling information to the fleet operator's central computer system as data messages for subsequent processing and action. This approach greatly smoothes out the communication from the data collection units by having them communicate with the central data center, not the fleet operator's central computer system. In this way, the fleet operator's central computer system can maintain the only database of fueling information and flight information, obviating the (prior art's) need to synchronize the data in the fleet operator's computer system with data in some other computer system. Avoiding this troublesome synchronization greatly improves data integrity, communications, and up-time.

Optionally, the data collection units are hand-held computer devices that communicate wirelessly with the central data center via cellular communication.

Optionally, the data collection units can communicate wirelessly by cellular, WiFi, or satellite. Also, the data collection units can comprise in-cab computer devices or fuel data units mounted on trucks or stationary carts.

In another aspect the present invention comprises n enterprise fuel management system for managing fueling operations of a fleet operated by a fleet operator having a central computer system at a data center and operating vehicles at multiple locations. The system includes a non-synchronizing central data center in communication with the fleet operator's central computer system for forwarding data to the fleet operator's central computer system and for receiving data from the fleet operator's central computer system. The non-synchronizing central data center is operative for communicating data to and from the fleet operator's central computer system without maintaining a database of such information synchronized with the fleet operator's central computer system. At each location one or more data collection units are provided for collecting fueling information and forwarding it to the central data center. In this regard, the data collection units communicate the collected fueling information wirelessly to the central data center. Also, the central data center gathers fueling information from the various data collection units and communicates the gathered fueling information to the fleet operator's central computer system as data messages for subsequent processing and action by the fleet operator's central computer system.

DETAILED DESCRIPTION

Figure 2:
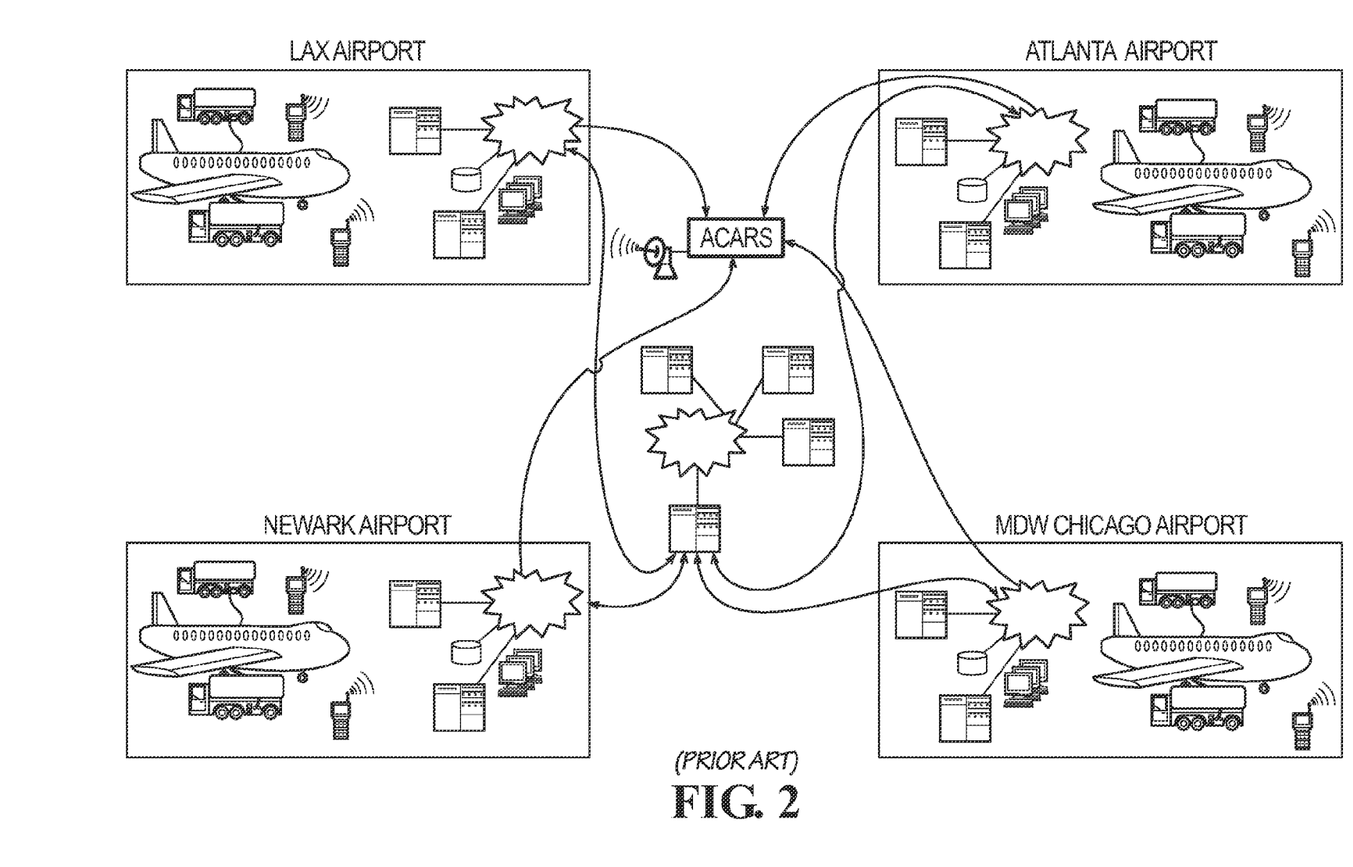
FIG. 2 is a schematic illustration of the prior art fuel management messaging system of FIG. 1.

Turning now to the drawing figures, wherein like reference numerals represent like parts throughout the several views, FIGS. 1 and 2 depict a prior art fuel management system as described in the Background portion herein.

Figure 3:
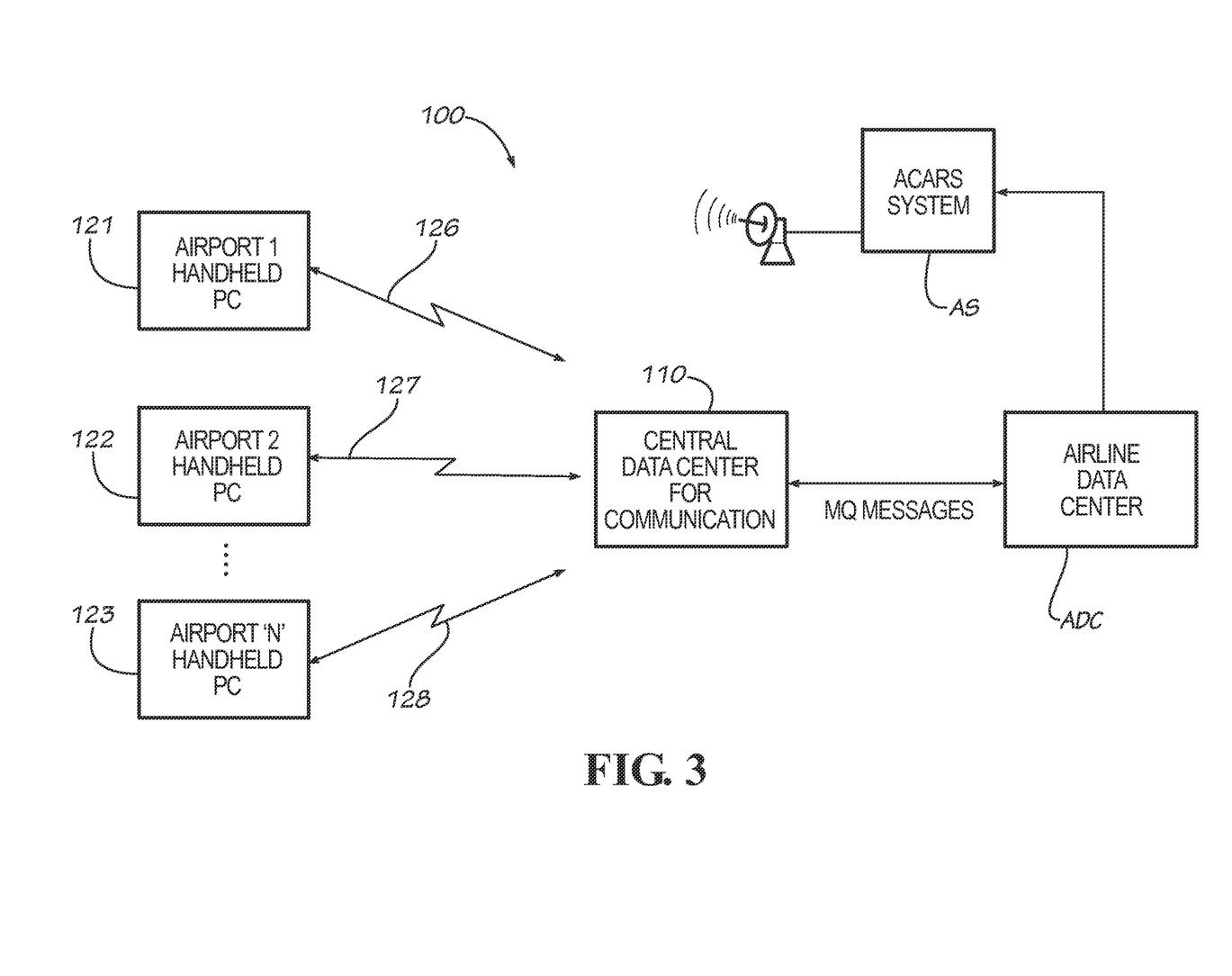
FIG. 3 is a schematic illustration of an enterprise fuel management system according to a first example form of the invention.

By contrast, as shown in FIG. 3 et seq., an enterprise fuel management system 100 is depicted. The enterprise fuel management system 100 is adapted for managing fueling operations of an aircraft fleet operated by a fleet operator having a central computer system at a data center ADC for operating aircraft at multiple airports. The system 100 includes a central data center 110 in communication with the fleet operator's central computer system ADC for forwarding data to the fleet operator's central computer system (e.g., the airline data center). The system 100 also includes, at each airport, one or more data collection units, such as data collection units 121, 122, 123, for collecting fueling information and forwarding it to the central data center 110. The data collection units are operable to receive data from the central data center 110 and for communicating data to the central data center (a two-way communication of data). While only three such hand-held units are shown in this figure, it is to be understood that there can be a great many more such units. Indeed, at present one United States-based airline operates at literally hundreds of airports and would employ hundreds or thousands of such hand-held units.

Advantageously, the data collection units 121-123 communicate the collected fueling information wirelessly to the central data center 110, and the data collection units 121-123 are not in direct communication with the fleet operator's central computer system ADC. This wireless communication can be accomplished with cellular communication technology, WiFi, BlueTooth, satellite, etc. It is preferred that cellular communication is used for this, due to its low cost, wide availability, good reliability, etc. On the other hand, in certain remote locales, satellite communication may be the most practical. Moreover, the central data center 110 gathers fueling information from the various data collection units and communicates the gathered fueling information to the fleet operator's central computer system ADC as data messages for subsequent processing and action by the fleet operator. This approach greatly smoothes out the communication from the data collection units by having them communicate with the central data center, not the fleet operator's central computer system. In this way, the fleet operator's central computer system need not replicate or duplicate its database of fueling information and flight information, obviating the (prior art's) need to synchronize the data in the fleet operator's computer system with data in some other computer system. As previously noted, this avoids the troublesome synchronization of the prior art and greatly improves data integrity, communications, and up-time.

Optionally, the data collection units 121-123 are hand-held computer devices that communicate with the central data center 110 via cellular communication links 126-128. The central data center 110 can operate to "buffer" some of this incoming data, to accumulate and/or assemble data for smooth communication to the fleet operator's data center (central computer system) ADC. But this buffering would not result in a duplicate database (the database contained in the airline's computer system would not be replicated in the central data center 110. This buffering does not require synchronization with a fleet operator's database. Moreover, there is some two-way data flow between the central data center 110 and the airline data center ADC, but it is in the form of messaging back and forth, not copying and synchronizing databases. Indeed, the messages can be passed back and forth as "MQ" data messages (message queue type of data transmissions). In this regard, the central data center 110 can be considered as the queue manager.

The airline data center ADC performs the decision-making, relegating the central data center 110 to a more or less communication manager function. Once the airline data center has obtained updated fueling information from the central data center 110, it can act on that information. One such action that the airline data center can take is to format and forward a message to the aircraft through a message relay service, such as ACARS operated by AirInc. Such is depicted in FIG. 3 in which the airline data center forwards a formatted message to the ACARS system AS, which then relays the message as a radio (RF) message to the aircraft cockpit. The aircraft cockpit typically includes an appropriate RF receiver for receiving such messages and printing them out or uploading the message data into the aircraft's electronic system(s).

Figure 4:
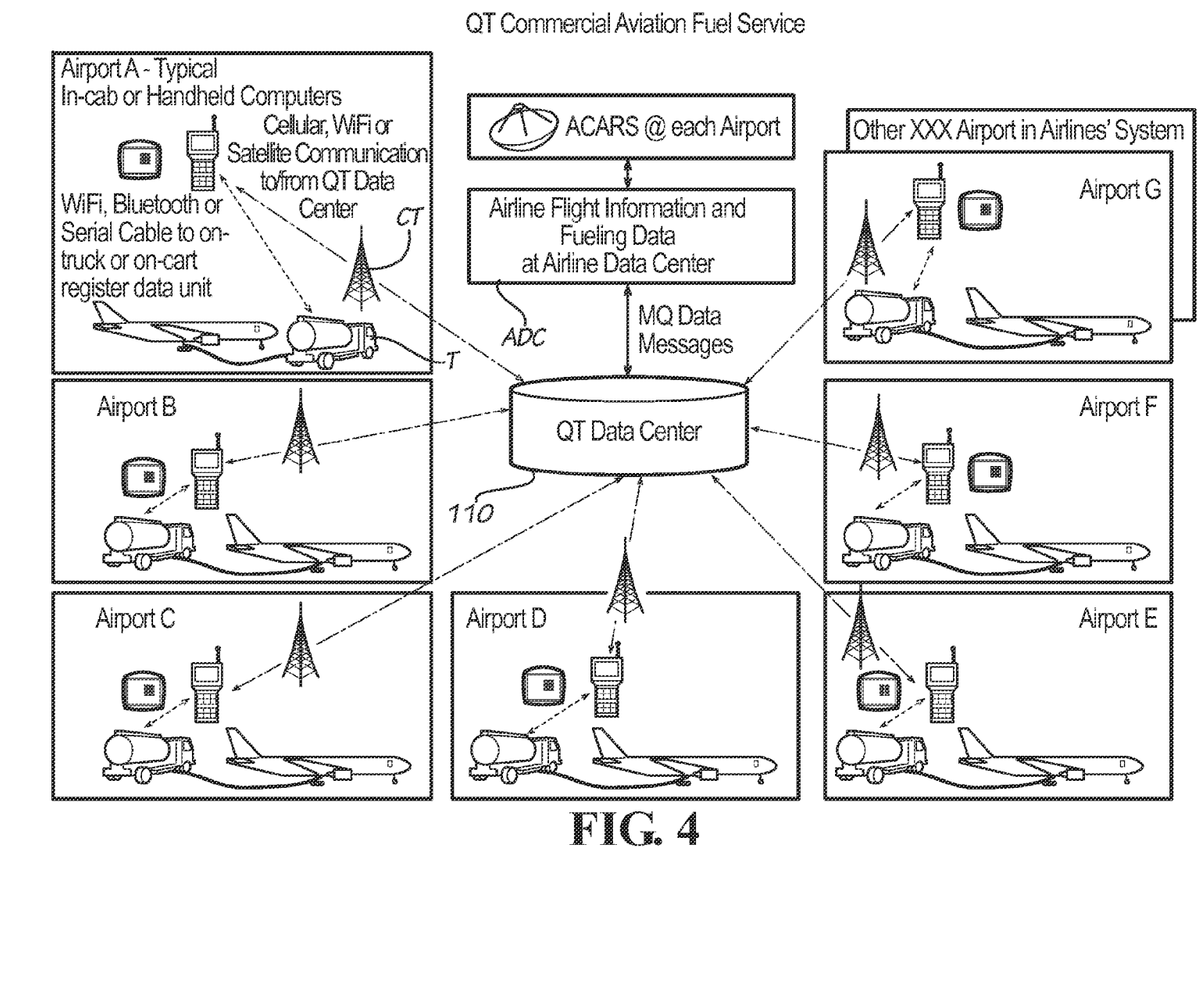
FIG. 4 is a schematic illustration of the enterprise fuel management system of FIG. 3, depicting a particular example form of the invention.

FIG. 4 schematically depicts such an arrangement/system 100 as applied to a particular airline, as an example. As shown, there are at least seven airports linked to the message data center 110. Each such airport, such as airports A-G, has a number of fueling trucks, typically operated by an "Into-Plane Service Provider" (ISP). Typically, the fueling trucks have a metering system for measuring the amount of fuel being dispensed to the aircraft. A hand-held device 121 is connected to the truck T by a WiFi connection or a wired serial cable connection. Alternatively, the hand-held device 121 can be connected to a stationary hydrant cart-mounted metering device that connects to handheld device 121 by a WiFi or Bluetooth connection. There are a number of known technologies for measuring or monitoring the amount of fuel dispensed to the aircraft and for communicating that data to the hand-held devices. For example, mechanical registers on trucks such as T or stationary hydrant carts can be outfitted with electronic pulse counters and data capture devices (fuel data units) that convert pulse counts into volume measurements that are communicated over WiFi or Bluetooth to a hand-held device 121 can be used. Likewise, electronic registers on trucks such as T connected via wired serial cable connection to an in-cab computing device with a dedicated data-only cellular modem can be used. Moreover, the fueler manually entering the fueling data from an electronic or mechanical register into the hand-held device 121 can be employed. Alternatively, the truck T or stationary hydrant cart mounted data capture device can include a cellular modem and communicate directly with the message data center 110. Moreover, the data capture device can be adapted to communicate by satellite, if need be.

Preferably, the hand-held devices are linked to the message data center 110 by cellular communication links. In this regard, the hand-held devices are linked wirelessly to a cell tower CT and then on to the message data center 110 through the cellular network and other conventional means. Alternatively, the hand-held devices can communicate to a local WiFi network and then on to the message data center 110. As shown in this figure and in FIG. 5, the message data center 110 sends MQ messages back and forth to the airline's computer system in its data center ADC. Alternatively, the message data center 110 can send other types of messages back and forth to the airline's computer system in its data center ADC. Typically, the airline computer system includes an airline flight information system and an airline fueling data system (in some installations these are combined into a single system). The airline computer system can be programmed to prepare messages to be relayed to the cockpit to inform the pilot of the amount (typically weight) of fuel added to the aircraft. The airline computer system typically prepares the content of the message to be sent and formats it (encodes it) in a format that the radio relay system (ACARS) requires. The encoded message is then forwarded to the ACARS system to be delivered to the aircraft by RF to an RF receiver in the cockpit. In this regard, the ACARS system typically employs a local transmitter at each airport or a regionally located transmitter.

Figure 5:
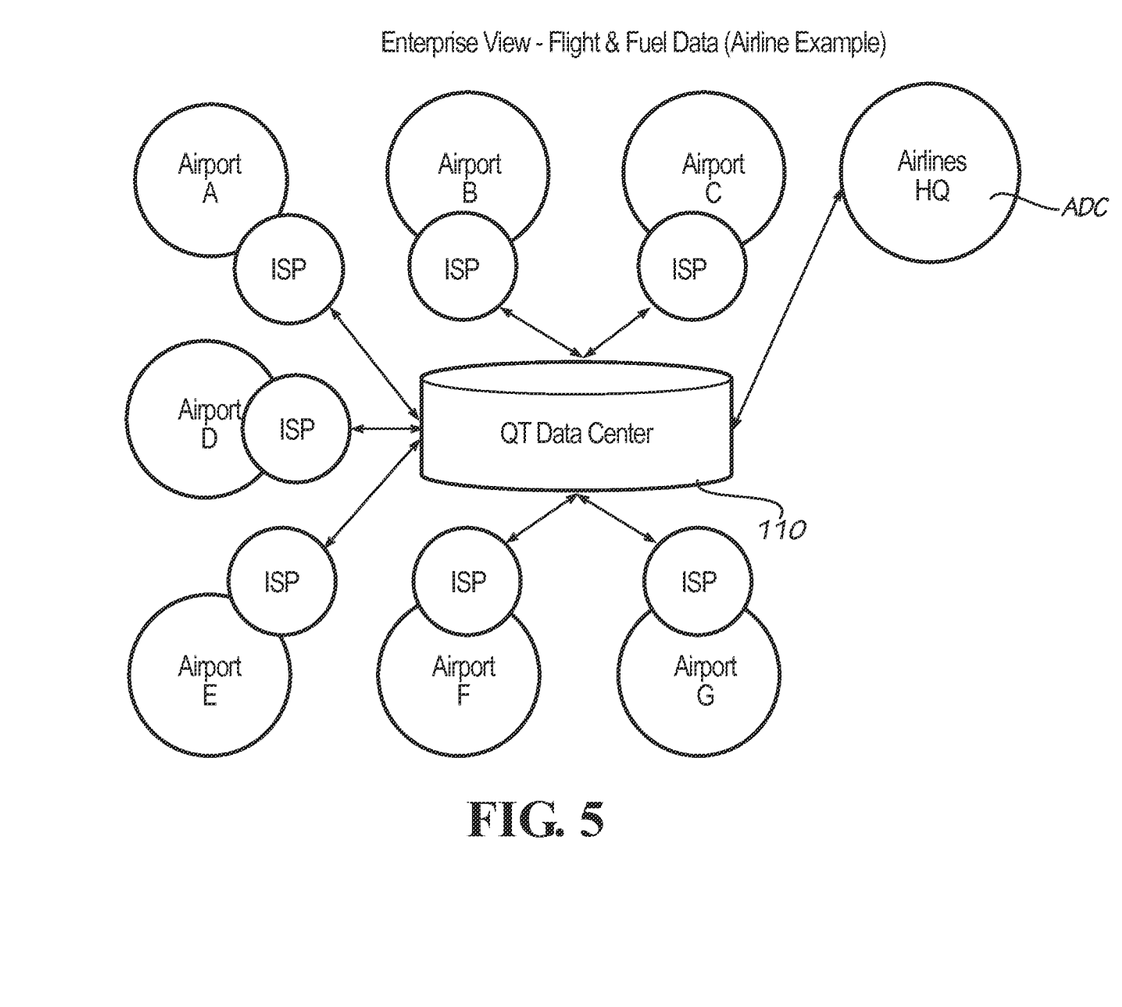
FIG. 5 is a schematic illustration of the enterprise fuel management system of FIG. 3, depicting a particular example form of the invention.

As represented in FIG. 5, the airline computer system sends flight and fuel order data to the message data center 110 along with real-time updates as flight schedules and fuel quantities may change. The message data center 110 relays these messages to the hand-held devices and/or to the ISP. The ISP performs the "uplifts" (loads the fuel) and sends real-time data of the fueling operation to the message data center 110. The message data center 110 reports this fueling information back to the airline computer system ADC for further action or decision-making.

Figure 6:
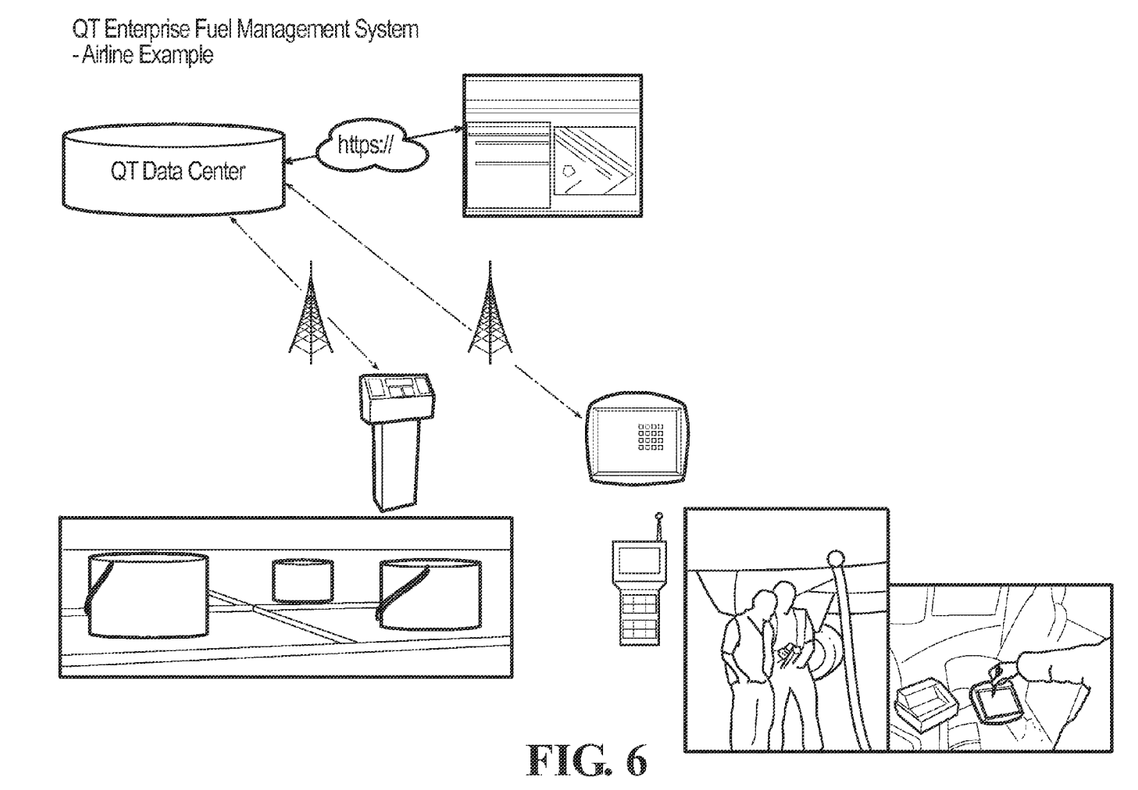
FIG. 6 is a schematic illustration of a portion of the enterprise fuel management system of FIG. 3.

As represented in FIG. 6, the system can be implemented in a manner using a web portal to provide anywhere, anytime access for the airline and/or a business partner (such as an ISP or a bulk fuel provider). The system can be configured to allow a refueling team to enter flight dispatch information and can use real-time GPS (global positioning system) tracking of the in-cab computing device in the fueling truck. Alternatively, the hand-held devices can include a GPS receiver for real-time tracking of the position of the hand-held devices. Likewise, the data capture device on the truck T or stationary hydrant cart can be outfitted with a GPS receiver for tracking of the truck T or stationary hydrant cart. The fueling trucks can be tanker trucks or so-called hydrant trucks.

The system includes role-based access to specific data on a web portal, providing administrative and management personnel with broad enterprise views of the fueling process and ensuring the security of the airline or business partner's information. In this regard, the role-based access prevents persons from gaining access to information that they should not see. The system also allows for up to the minute reporting, inventory reconciliation at each airport and across the entire airline (enterprise), and accurate, real-time fuel inventory information.

Figure 7:
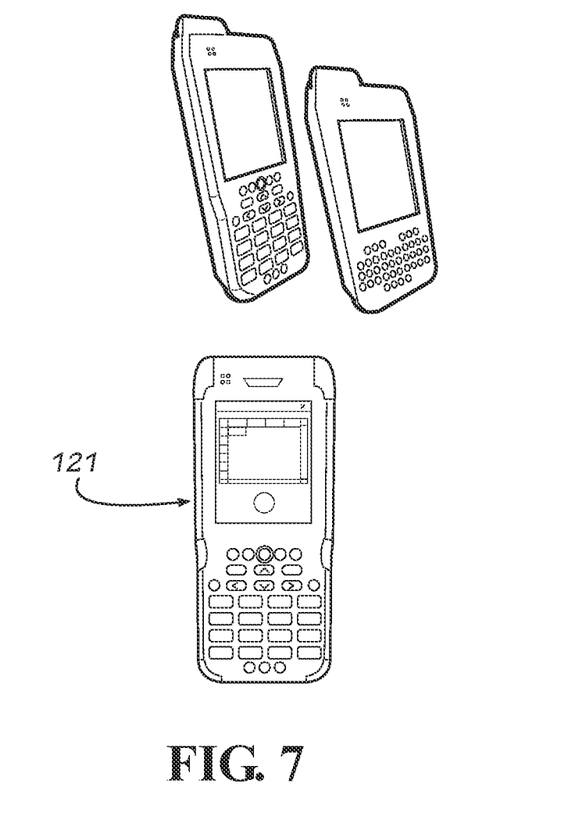
FIG. 7 is a schematic illustration of a portion of the enterprise fuel management system of FIG. 3, depicting an example hand-held device portion of the system.

Preferably, the hand-held devices, such as hand-held devices 121-123, are pocket-sized devices as shown in FIG. 7. One preferred version of such a device is the Intermec CN4e unit, a pocket-sized hand-held computer device with a numeric keyboard. Another preferred version of such a device is the Intermec CN70e unit, a pocket-sized hand-held computer device, which allows one to use its built-in bar code reading capability to capture fueling equipment identity information quickly, reliably, and easily. Typically, the fueling agent will not be entering a lot of data with the hand-held device. Through software, the keypad can enter alpha text data, similar to the operation of texting on cell phones. Such a unit has good battery life and can be provided with solar charging, if desired. Importantly, the housing is "intrinsically safe" (will not produce a spark or thermal effects that may cause any type of ignition of explosive gases or other flammable items), meeting airline industry safety requirements. The software application running on the hand-held devices (or in-cab computing devices) that captures the fuel quantities can be updated remotely over the wireless network. In addition, client support personnel can remotely log in to the hand-held device (or in-cab computing device) to help the fuelers with any problems as well as monitor the devices for battery life and wireless networks signal strength. The hand-held device (or in-cab computing device) user must log in to the device, protecting airline and business partner data and with integration to the staff management system, can ensure that the fueler has been trained to use the system and is certified to execute the fuel order for the type of aircraft assigned to the flight.

Figure 8:
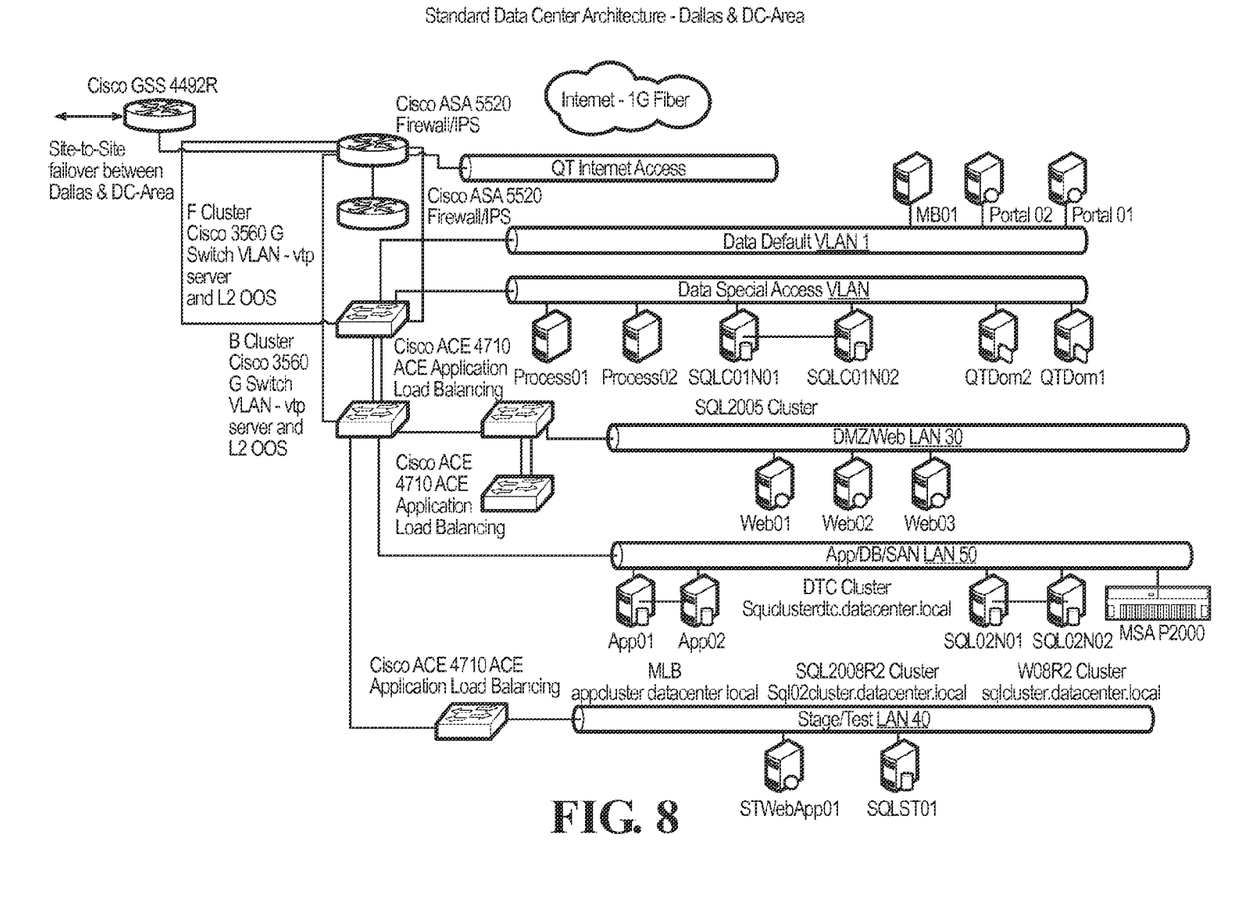
FIG. 8 is a schematic illustration of a central data center portion of the enterprise fuel management system of FIG. 3 and in particular shows a site-to-site fail-over configuration.

FIG. 8 depicts the fully redundant data center architecture as deployed in two locations and shows the computing equipment that is used to support both normal operations and the automated failover between locations should one or the other locations lose power, Internet connectivity, or experience a natural disaster.

Figure 9:
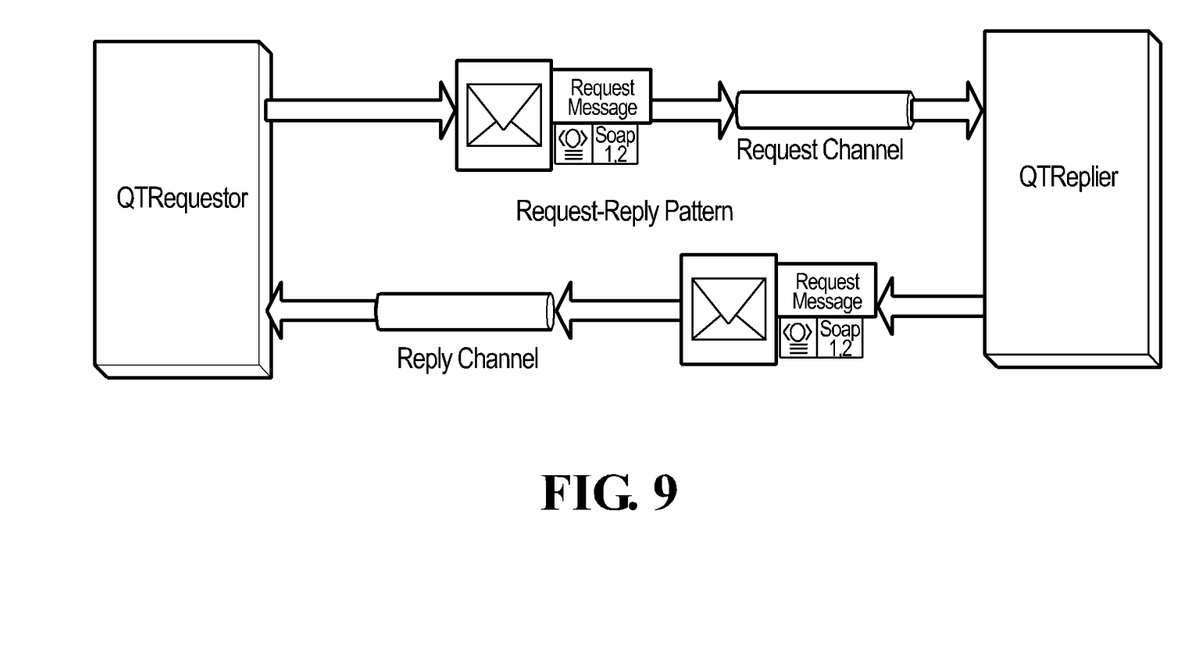
FIG. 9 is a schematic illustration of the enterprise fuel management system of FIG. 3 and in particular shows message communication path.

FIG. 9 depicts the message queuing system used by the data center to communicate with external systems and shows the types of systems that could provide flight, fuel order and fueler staffing data to support the enterprise fuel management system.

Optionally, the system can be provided with WiFi to Cell failover. For example, one can configure the system to allow communication between the data center to the HH's to switch from WiFi to cellular if the WiFi service goes down and then to switch back to WiFi when that service comes back up. One way to accomplish the switch is to use the FDU to change WiFi modes from infrastructure to ad hoc on the fly while the switch is made. Notably, this can be accomplished even in the middle of fueling, when communicating to the FDU is most critical in capturing the pulse counts.

One way to accomplish the WiFi to Cellular failover is as follows. While operating in the normal mode, the handheld computers use Wi-Fi is to communicate to the FDUs (Fuel Data Units) and cellular is used to communicate to the data center. The ad hoc mode of network configuration is used on the FDUs to segregate that signal from any Wi-Fi network that is in place at the airport.

In this new mode, Wi-Fi is the main mobile device communication protocol both to the data center and to the FDUs. The FDUs in this mode are set up in Infrastructure network configuration as the handheld computer can only operate on one configuration or the other. The airport should have a set of Wi-Fi access points, set up in Infrastructure network configuration and that broadly cover the ramp area with good signal strength. If the Wi-Fi network is disabled or has communication issues, the handhelds can automatically switch to the backup cellular network protocol to communicate to the datacenter. The handhelds and the FDUs will switch their Wi-Fi network configuration to ad hoc mode—reflecting the usual mode. Notably, this switch can happen in the middle of refueling an aircraft—ensuring that the data for the transaction is accurate. And the system can switch back to the new mode automatically whenever the Wi-Fi signal is back up. A cellular network account should be active substantially at all times in order for this switch to work on the fly.

Internal software monitoring modules are operable for detecting an Internet, total outage (i.e. network switch power), or an FDU outage. The monitor module(s) detect any scenario mentioned above and have the ability to switch communication modes from Wi-Fi to Cellular. These modes are defined as states within the mobile software driving fueling application workflows to accommodate which communication state is available. The communication states are defined as the ability of the Wi-Fi and Cellular components of the device to communicate to the FDU or the datacenter. The monitor madule also has the capability to determine what part of the fueling the Fueler is in to determine to most accurate and safe mode of communication, reducing the impact of the failure of communication and increasing the accuracy of data captured for a Fuel Service Record. The FDU also has a monitor to detect communications failures in a manner similar to that of the mobile device. The FDU monitor's primary function is to switch back and forth between Ad-hoc and Infrastructure modes of network configuration communication, matching the network configuration of the mobile device. The data captured within the FDU is transmitted to the handheld device without missing any information, is passed to the data center and then on to the airline's data systems.

Optionally, the system can be configured to check the fueler's certification status to be sure he is qualified to the fuel the type of plane used for the flight. To accomplish this, the airline's database can be queried to verify that the person doing the fueling is properly qualified for the particular aircraft to be fueled.

Also optionally, the system can be configured to use satellite communications where no Wi-Fi or cellular service is available. In certain situations there may not be a reliable communication system of any kind, and in such situations the system can provide a batch processing data upload/download capability.

For a location without reliable wireless access, the data collection units can send and receive a day's worth of operations information while docked in a cradle with connectivity to a wired network. In this regard, the data collection units can be placed in a cradle that is connected to a local network with access to the Internet. The data collection units can automatically download a full day of the fleet operator's operations information. This information is communicated from the fleet operator's central data system via the data center to the data collection units via the wired local network connection to the cradle. Any updates to the operational data are made manually on the data collection units. The data collection units are then placed again in the cradles either throughout the day or at the close of the business day. When placed in the cradle, the data collection units automatically connect to the Internet via the wired local network and the completed operations data are sent back to the fleet operator's central data system via the data center.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. An enterprise fuel management system for managing fueling operations of a fleet of aircraft operated by a fleet operator having a central computer system at a data center and operating vehicles at multiple locations, the system comprising:
 a central data center in communication with the fleet operator's central computer system for forwarding data to the fleet operator's central computer system;
 at each location one or more data collection units for collecting fueling information and forwarding it to the central data center, the data collection units communicating the collected fueling information wirelessly to the central data center, whereby the data collection units are not in direct communication with the fleet operator's central computer system; and wherein the central data center gathers fueling information from the various data collection units and communicates the gathered fueling information to the fleet operator's central computer system as data messages for subsequent processing and action to enable the fleet operator to ensure that appropriate amounts of fuel are delivered to the aircraft during refueling.

2. The enterprise fuel management system of claim 1 wherein the data collection units comprise hand-held computer devices.

3. The enterprise fuel management system of claim 1 wherein the data collection units comprise in-cab computer devices.

4. The enterprise fuel management system of claim 1 wherein the data collection units comprise fuel data units mounted on trucks or stationary carts.

5. The enterprise fuel management system of claim 1 wherein the data collection units communicate wirelessly via cellular.

6. The enterprise fuel management system of claim 1 wherein the data collection units communicate wirelessly via WiFi.

7. The enterprise fuel management system of claim 1 wherein the data collection units communicate wirelessly via satellite.

8. The enterprise fuel management system of claim 1 wherein the fleet operator is an airline, the fleet vehicles are aircraft and the fleet locations are airports.

9. The enterprise fuel management system of claim 1 wherein the system is configured and adapted to allow the wireless communication between the handheld units and the central data center to be switched from one communication mode to another and back again to allow uninterrupted wireless communication despite temporary communication outages in one communication mode.

10. An enterprise fuel management system for managing fueling operations of a fleet of aircraft operated by a fleet operator having a central computer system at a data center and operating vehicles at multiple locations, the system comprising:

a non-synchronizing central data center in communication with the fleet operator's central computer system for forwarding data to the fleet operator's central computer system and for receiving data from the fleet operator's central computer system, the non-synchronizing central data center being operative for communicating data to and from the fleet operator's central computer system without maintaining a database of such information synchronized with the fleet operator's central computer system;

at each location one or more data collection units for collecting fueling information and forwarding it to the central data center, the data collection units communicating the collected fueling information wirelessly to the central data center; and wherein the central data center gathers fueling information from the various data collection units and communicates the gathered fueling information to the fleet operator's central computer system as data messages for subsequent processing and action by the fleet operator's central computer system so that the fleet operator can ensure that appropriate amounts of fuel are delivered to the aircraft during refueling.

11. The enterprise fuel management system of claim 10 wherein the data collection units comprise hand-held computer devices.

12. The enterprise fuel management system of claim 10 wherein the data collection units comprise in-cab computer devices.

13. The enterprise fuel management system of claim 10 wherein the data collection units comprise fuel data units mounted on trucks or stationary carts.

14. The enterprise fuel management system of claim 10 wherein the fleet operator is an airline, the fleet vehicles are aircraft and the fleet locations are airports.

15. The enterprise fuel management system of claim 10 wherein the system is configured and adapted to allow the wireless communication between the handheld units and the central data center to be switched from one communication mode to another and back again to allow uninterrupted wireless communication despite temporary communication outages in one communication mode.

* * * * *